United States Patent
Sundaramoorthi et al.

(10) Patent No.: US 12,493,966 B2
(45) Date of Patent: Dec. 9, 2025

(54) ALIGNED TIME SURFACES VIA DENSE OPTICAL FLOWS FOR EVENT-BASED OBJECT DETECTION, IDENTIFICATION AND TRACKING

(71) Applicant: Raytheon Company, Arlington, VA (US)

(72) Inventors: Ganesh Sundaramoorthi, Belmont, MA (US); Kin Gwn Lore, Belmont, MA (US)

(73) Assignee: Raytheon Company, Arlington, VA (US)

( * ) Notice: Subject to any disclaimer, the term of this patent is extended or adjusted under 35 U.S.C. 154(b) by 314 days.

(21) Appl. No.: 18/088,094

(22) Filed: Dec. 23, 2022

(65) Prior Publication Data

US 2024/0212166 A1    Jun. 27, 2024

(51) Int. Cl.
| | |
|---|---|
| *G06T 7/20* | (2017.01) |
| *G06T 3/18* | (2024.01) |
| *G06T 5/50* | (2006.01) |
| *G06T 5/73* | (2024.01) |

(52) U.S. Cl.
CPC ............... *G06T 7/20* (2013.01); *G06T 3/18* (2024.01); *G06T 5/73* (2024.01)

(58) Field of Classification Search
CPC .... G06T 7/20; G06T 3/18; G06T 5/73; G06T 2207/10016; G06T 2207/20201; G06T 5/50; G06T 3/00
See application file for complete search history.

(56) References Cited

U.S. PATENT DOCUMENTS 11,290,682 B1 * 3/2022 Shaburov .................. G06T 5/70
2016/0330374 A1 * 11/2016 Ilic ........................... H04N 23/64
(Continued)

FOREIGN PATENT DOCUMENTS

CN          116703965 A  *  9/2023  ............. G06T 5/002

OTHER PUBLICATIONS

Nagata, Jun, et al. "Optical Flow Estimation by Matching Time Surface with Event-Based Cameras"; Sensors, vol. 21, No. 4, Feb. 6, 2021, p. 1150, https://doi.org/10.3390/s21041150. Accessed Mar. 26, 2025. (Year: 2021).*
(Continued)

*Primary Examiner* — John Villecco
*Assistant Examiner* — Kyla Guan-Ping Tiao Allen
(74) *Attorney, Agent, or Firm* — Schwegman Lundberg & Woessner, P.A.

(57) ABSTRACT

Systems and methods are provided for producing aligned and aggregated aligned time surfaces. An exemplary method includes: receiving camera event data from a first location; computing, using the camera event data, a plurality of unaligned time surfaces; determining a plurality of optical flows corresponding to the unaligned time surfaces; determining, using the optical flows, an accumulated optical flow for mapping displacement between any two time periods; producing, using the optical flows, for a plurality of consecutive mapped time surfaces; performing, using the accumulated optical flow, warping of the mapped time surfaces producing corresponding aligned time surfaces; and aggregating the aligned time surfaces to produce an image having lowered blurring of object boundaries.

20 Claims, 6 Drawing Sheets

(56) References Cited

U.S. PATENT DOCUMENTS

| | | | |
|---|---|---|---|
| 2023/0216999 A1* | 7/2023 | Zobel | G06T 5/60 348/42 |
| 2023/0267624 A1* | 8/2023 | Konda | G06T 7/238 382/100 |

OTHER PUBLICATIONS

Beauchemin, S. S., & Barron, J. L. (1995). The computation of optical flow. ACM Computing Surveys, 27(3), 433-466. https://doi.org/10.1145/212094.212141 (Year: 1995).*

"International Application Serial No. PCT/US2023/078356, International Search Report mailed Mar. 11, 2024", 3 pgs.

"International Application Serial No. PCT/US2023/078356, Written Opinion mailed Mar. 11, 2024", 8 pgs.

Gallego, Guillermo, et al., "Event-based Vision: A Survey", Computer Science, Medicine IEEE transactions of pattern analysis and machine intelligence, (2020), 30 pgs.

Guillermo, Gallego, et al., "A Unifying Contrast Maximization Framework for Event Cameras, with Applications to Motion, Depth, and Optical Flow Estimation", arxiv.org, Cornell University Library, 201 Olin Library Cornell University Ithaca, NY 14853, (Apr. 4, 2018), 16 pgs.

Lagorce, Xavier, et al., "HOTS: A Hierarchy of Event-Based Time-Surfaces for Pattern Recognition", IEEE Transactions on Pattern Analysis and Machine Intelligence, IEEE Computer Society, USA vol. 39, No. 7, (Jul. 1, 2017), 1346-1359.

Wu, Yilun, et al., "Lightweight Event-based Optical Flow Estimation via Iterative Deblurring", [Online]. Retrieved from the Internet: <https://export.arxiv.org/abs/2211.13726v1>, (Nov. 24, 2022), 9 pgs.

Zhu, Alex Zihao, et al., "Unsupervised Event-Based Learning of Optical Flow, Depth, and Egomotion", IEEE/CVF Conference on Computer Vision and Pattern Recognition (CVPR), IEEE, (Jun. 15, 2019), 989-997.

* cited by examiner

ALIGNED TIME SURFACES VIA DENSE OPTICAL FLOWS FOR EVENT-BASED OBJECT DETECTION, IDENTIFICATION AND TRACKING

BACKGROUND

Computer vision is a field that enables computers and systems to derive meaningful information from digital images, videos, and other visual inputs—and take actions or make recommendations based on that information. However, many event computer vision systems have difficulty assessing objects in images due to blurred object boundaries. This contributes to inaccuracies in object localization/missed detections/false alarms, incorrect identifications, and decreased object detection and identification latency.

There is a need to reduce object boundary blurring when aggregating asynchronous events over time from event camera data.

SUMMARY

According to one aspect of the subject matter described in this disclosure, an example system for producing aligned time surfaces is provided. The system includes one or more computing device processors, and one or more computing device memories. The one or more computing device memories are coupled to the one or more computing device processors. The one or more computing device memories storing instructions executed by the one or more computing device processors. The instructions are configured to: receive camera event data from a first location; compute, using the camera event data, a plurality of unaligned time surfaces; determine a plurality of optical flows corresponding to the unaligned time surfaces; determine, using the optical flows, an accumulated optical flow for mapping displacement between any two time periods; produce, using the optical flows, for a plurality of consecutive mapped time surfaces; perform warping, using the accumulated optical flow, of the mapped time surfaces producing corresponding aligned time surfaces; and aggregate the aligned time surfaces to produce an image having lowered blurring of object boundaries.

In this system, the first location may be an event camera system. The first location may be a remote storage device for storing the camera event data. While computing the unaligned time surfaces, the instructions may be configured to aggregate the unaligned time surfaces in accordance with time and space. The unaligned time surfaces may include information of at least one moving object.

In this system, while determining the plurality of optical flows, the instructions may be configured to determine the velocity of at least one moving object in the unaligned time surfaces. While performing warping of the unaligned time surfaces, the instructions may be configured to align, using the accumulated optical flow, the aligned time surfaces in accordance with time and space. The instructions may be further configured to send the image downstream to an object identification, detection, and/or tracking process. While sending the image downstream, the instructions may be configured to execute the object identification, detection, and/or tracking process on a remote system.

According to another aspect of the subject matter described in this disclosure, an example method for producing aligned time surfaces is provided. The method includes: receiving camera event data from a first location; computing, using the camera event data, a plurality of unaligned time surfaces; determining a plurality of optical flows corresponding to the unaligned time surfaces; determining, using the optical flows, an accumulated optical flow for mapping displacement between any two time periods; producing, using the optical flows, for a plurality of consecutive mapped time surfaces; performing, using the accumulated optical flow, warping of the mapped time surfaces producing corresponding aligned time surfaces; and aggregating the aligned time surfaces to produce an image having lowered blurring of object boundaries.

In this method, the first location may be an event camera system. The first location may be a remote storage device for storing the camera event data. Computing the unaligned time surfaces may include aggregating the unaligned time surfaces in accordance with time and space. The unaligned time surfaces may include information of at least one moving object. Determining the plurality of optical flows may include determining the velocity of at least one moving object in the unaligned time surfaces. The accumulated optical flow may include accumulated information associated with the processing of the optical flows. Performing warping of the unaligned time surfaces may include aligning, using the accumulated optical flow, the aligned time surfaces in accordance with time and space. The method may further include sending the image downstream to an object identification, detection, and/or tracking process. Sending the image downstream may include executing the object identification, detection, and/or tracking process on a remote system.

According to another aspect of the subject matter described in this disclosure, an example non-transitory computer-readable storage medium storing instructions which when executed by a computer cause the computer to perform an example method for producing aligned time surfaces is provided. The method includes the following: receiving camera event data from a first location; computing, using the camera event data, a plurality of unaligned time surfaces; determining a plurality of optical flows corresponding to the unaligned time surfaces; determining, using the optical flows, an accumulated optical flow for mapping displacement between any two time periods; producing, using the optical flows, for a plurality of consecutive mapped time surfaces; performing, using the accumulated optical flow, warping of the mapped time surfaces producing corresponding aligned time surfaces; and aggregating the aligned time surfaces to produce an image having lowered blurring of object boundaries.

Additional features and advantages of the present disclosure is described in, and will be apparent from, the detailed description of this disclosure.

BRIEF DESCRIPTION OF THE DRAWINGS

The disclosure is illustrated by way of example, and not by way of limitation, in the figures of the accompanying drawings in which like reference numerals are used to refer to similar elements. It is emphasized that various features may not be drawn to scale and the dimensions of various features may be arbitrarily increased or reduced for clarity of discussion.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context.

The disclosure describes systems and methods for aligning time surfaces for event-based object detection, identification, and tracking. This involves reducing object boundary blurring when aggregating asynchronous events over time from event camera data by computing an alignment of aggregated events with respect to a time t. In particular, the approach includes inputting events over a time interval $\Delta t$. Time surfaces are computed for time intervals with length $\Delta t' < \Delta t$. Optical flows are computed between consecutive time surfaces for each interval of length $\Delta t'$. Next, compute the accumulation of optical flow up to each interval $\Delta t'$. For each mapped time surface, compute the warp of the mapped time surface using the accumulated flow, producing an aligned time surface. The aligned time surface may be input to an object identification, detection, and/or tracking system used in object detection, identification, and/or tracking.

Figure 1:
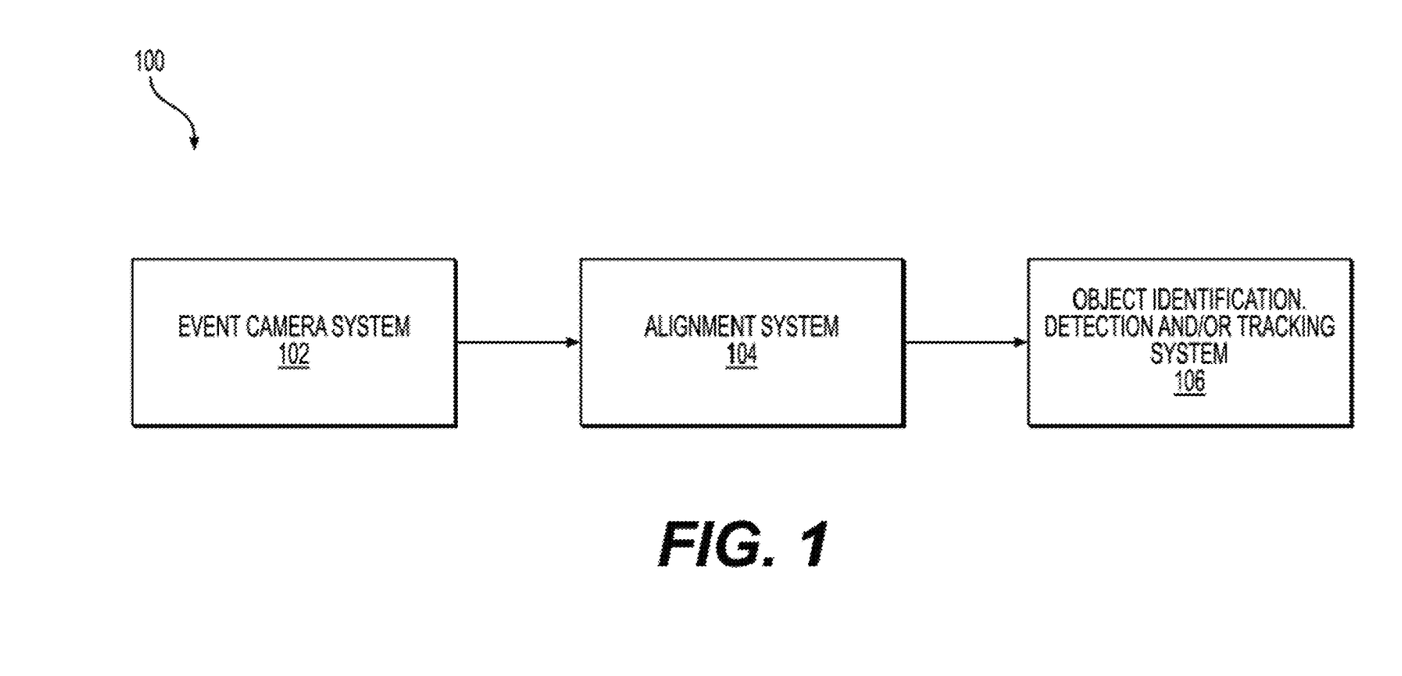
FIG. 1 is a schematic diagram of example architecture 100 for event-based object detection, identification, and tracking, in accordance with some embodiments.

FIG. 1 is a schematic diagram of example architecture 100 for event-based object detection, identification, and tracking, in accordance with some embodiments. Architecture 100 includes an event camera system 102, an alignment system 104, and a downstream vison system 106. The event camera system 102 may consist of an event camera producing various unaligned event camera data. The event camera system 102 may aggregate the unaligned event camera data. Note the unaligned camera data are used to compute the unaligned time surfaces having blurred object boundaries due to aggregation. The event camera system 102 may send the unaligned event camera data to alignment camera system 104. In some implementations, event camera system 102 may store the event camera data to either a local or remote storage device, which is later sent by event camera system 102 to alignment system 104.

When the alignment system 104 receives the unaligned camera data from event camera system 102, it aligns the aggregated unaligned event camera data to a time for object detection and identification using such time surfaces. This requires the alignment system 104 to reduce object boundary blurring associated with aggregating asynchronous events over time from the unaligned event camera data by computing an alignment of aggregated events with respect to a time. The alignment system 104 utilizes an algorithm to align the aggregated unaligned event camera data.

Utilizing the algorithm, the alignment system 104 input events over a time interval $\Delta t$ received from event camera system 102. The alignment system 104 computes time surfaces for intervals $\Delta t' < \Delta t$. Also, the alignment system 104 calculates dense optical flows between consecutive time surfaces. The dense optical flows are integrated over time to produce several mappings. For each time surface, the alignment system 104 computes the warp of the time surface, producing an aligned time surface. Note alignment system 104 may be implemented as a computer system to perform the operations of the algorithm.

The aligned time surfaces may be input to an object identification, detection, and/or tracking system 106 used in object detection, identification, and/or tracking. The object identification, detection, and/or tracking system 106 may be remote or local to alignment system 104. With object boundary blurring lowered, the alignment system 104 provides a reliable signal to object identification, detection, and/or tracking system 106 to downstream pipelines for event-based computer vision application (e.g., detection, localization, identification). Specifically, the alignment system 104 tackles the problem of reducing object boundary blurring when aggregating asynchronous events over time from event camera data.

Figure 2A:
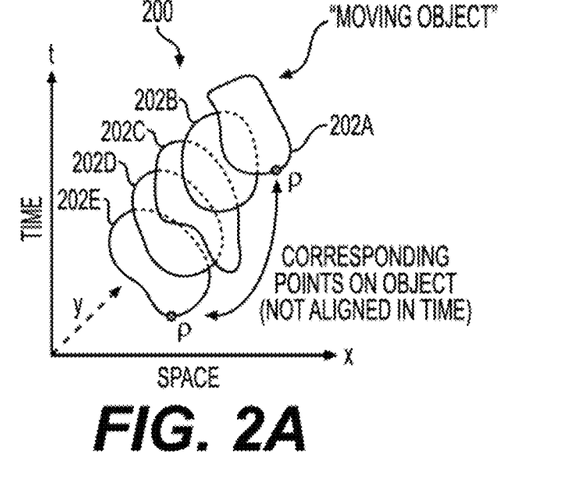
FIGS. 2A-2C are schematic diagrams of the unaligned event camera data, details of the optical flow, and warping of the time surfaces.
Figure 2B:
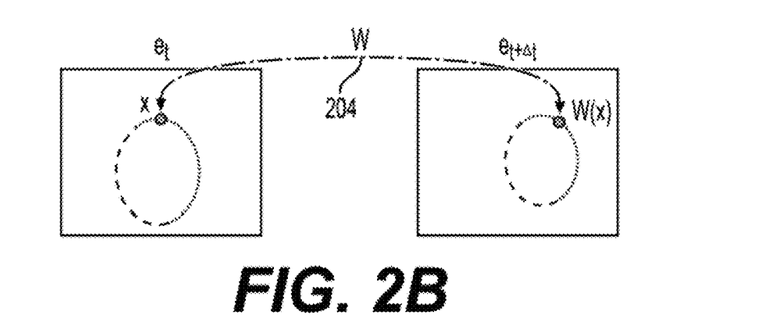
Figure 2C:
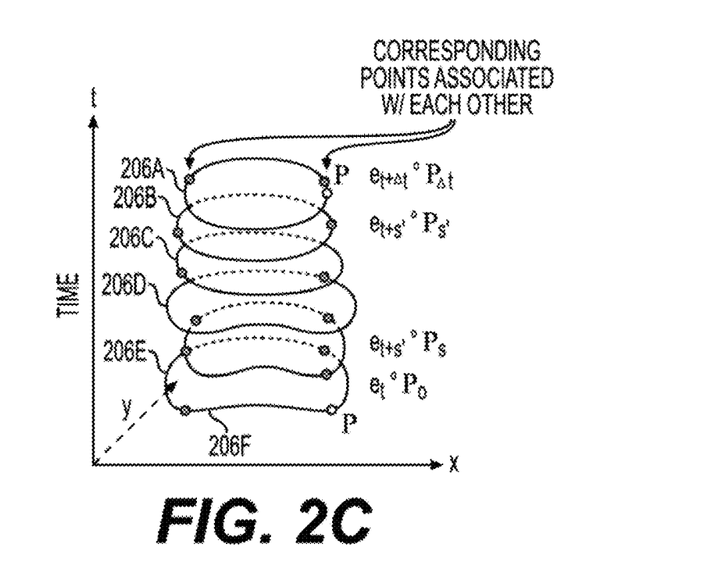

FIGS. 2A-2C are schematic diagrams of the unaligned event camera data, details of the optical flow, and warping of the time surfaces. FIG. 2A shows unaligned camera data 200 being defined by time surfaces 202A-202E. Time surfaces 202 are each positioned in a plane defined by an X-Y space but not aligned in time. Each time surface 202 is associated with an event occurring at different time periods. The points P in each time surfaces 202A-202E correspond to a moving object not aligned in time. Aggregating the unaligned camera data 200 produces object boundary blurring for the moving object.

FIG. 2B shows computing optical flows between consecutive time surfaces $e_t$ and $e_{t+\Delta t}$. In this case, the mapping 204 is defined by the relationship $$w = e_{t+s} \circ \varphi_s. \quad \text{Eq. 1}$$

where unaligned time surface $e_{t+s}$ is a time surface, $\varphi_s$ is a displacement parameter for determining where the object in the visual has been displaced, and w is the mapped time surface. Eq. 1 involves the function composition of unaligned time surface $e_{t+s}$ and displacement parameter $\varphi_s$ to compute a mapped time surface w. Moreover, Eq. 1 is applied to all consecutive unaligned time surfaces to produces a consecutive collection of mapped time surfaces. Warping is performed on the mapped time surfaces to produce aligned time surfaces. For this to occur, the displacement parameter $\varphi_s$ must be determined.

The mapping parameter $\varphi_s$ is defined by $$\varphi_s(x) = x + \int_0^s v(t, \varphi_t(x))dt \quad \text{Eq. 2}$$

where x is the location that one seeks the mapping of, $\varphi_s(x)$ is the mapping of x, and v is the optical flow. The optical flow is the pattern of apparent motion of objects, surfaces, and edges in a visual scene caused by the relative motion between an observer and a scene. Optical flow can also be defined as the distribution of apparent velocities of movement of brightness patterns in an image associated with a moving object. As shown above in Eq. 2, the optical flow v is integrated to compute the mapping, and the displacement is available by subtracting from the identity map x. The computation of new optical flows for each unaligned time surface is used to compute an accumulated optical flow due to $v(t, \varphi_t(x))$.

FIG. 2C shows warping mapped time surfaces to produce aligned time surfaces 206. In this case, the corresponding points P for each aligned time surfaces 206A-206F are associated with each other. Aligned time surfaces 206A-206F are aligned in time and space. Note that aligned time surfaces 206A-206F are produced by computing the mapped time surfaces of consecutive unaligned time surfaces using Eq. 1.

Figure 3:
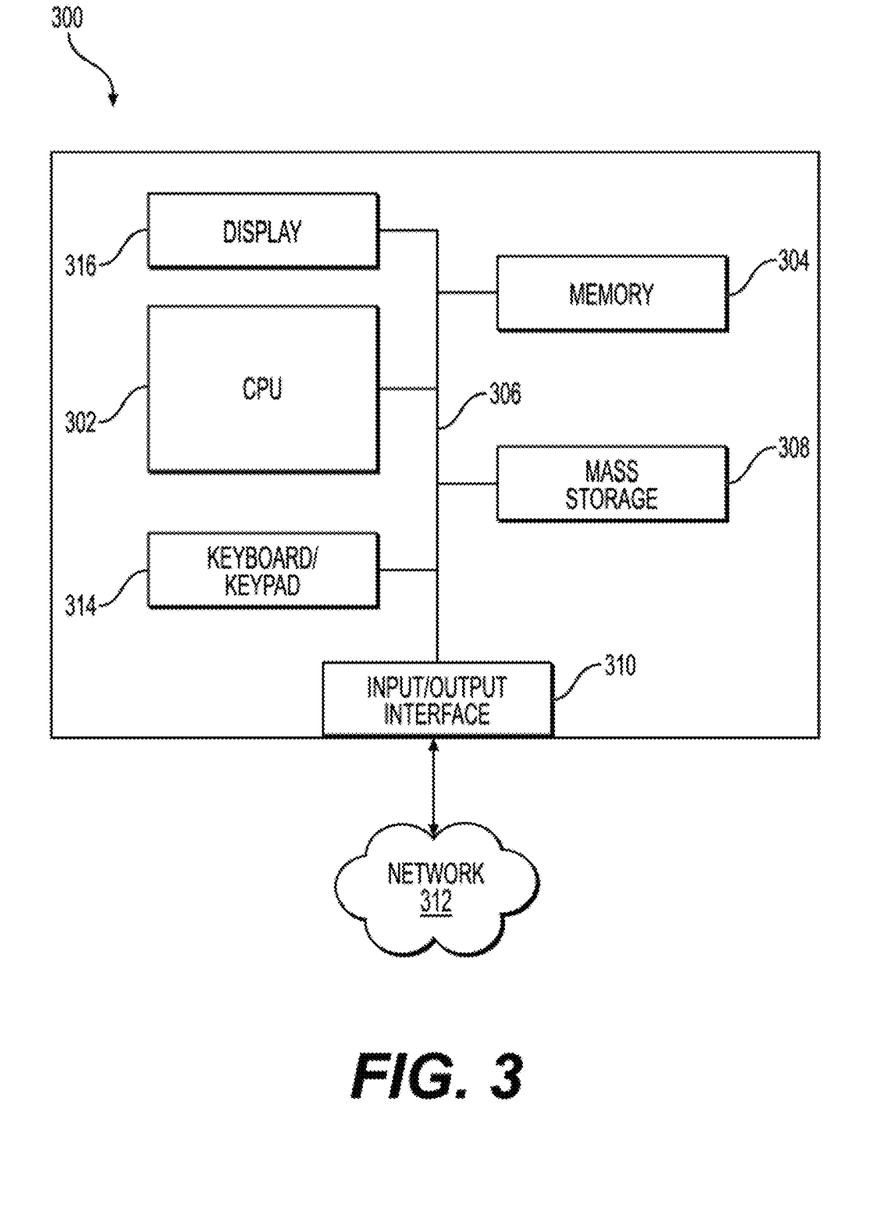
FIG. 3 is a schematic diagram of an exemplary computer system 300 arranged to perform functions associated with the alignment system of FIG. 1, in accordance with some embodiments.

FIG. 3 shows a diagram of an exemplary computer system 300 arranged to perform functions associated with the alignment system 104 of FIG. 1, in accordance with some embodiments. The computer system 300 may be implemented as a virtual machine or a physical machine. The exemplary computer system 300 includes a central processing unit (CPU) 302, a memory 304, and an interconnect bus 306. The CPU 302 may include a single microprocessor or a plurality of microprocessors or special purpose processors for configuring computer system 300 as a multi-processor system. The memory 304 illustratively includes a main memory and a read only memory. The computer 300 also includes the mass storage device 308 having, for example, various disk drives, tape drives, etc. The memory 304 also includes dynamic random-access memory (DRAM) and high-speed cache memory. In operation, memory 304 stores at least portions of instructions and data for execution by the CPU 302. The memory 304 may also contain computing elements, such as Deep In-Memory Architectures (DIMA), wherein data is sent to memory and a function of the data (e.g., matrix vector multiplication) is read out by the CPU 302.

The mass storage 308 may include one or more magnetic disk, optical disk drives, and/or solid-state memories, for storing data and instructions for use by the CPU 302. At least one component of the mass storage system 308, preferably in the form of a non-volatile disk drive, solid state, or tape drive, stores a database used for processing data and controlling functions associated with receiving user inputs and/or display data associated with an object trajectory prediction system such as system 300. The mass storage system 308 may also include one or more drives for various portable media, such as a floppy disk, flash drive, a compact disc read only memory (CD-ROM, DVD, CD-RW, and variants), memory stick, or an integrated circuit non-volatile memory adapter (i.e. PC-MCIA adapter) to input and output data and code to and from the computer system 300.

The computer system 300 may also include one or more input/output interfaces for communications, shown by way of example, as interface 310 and/or a transceiver for data communications via the network 312. The data interface 310 may be a modem, an Ethernet card or any other suitable data communications device. To provide the functions of a processor according to FIG. 3, the data interface 310 may provide a relatively high-speed link to a network 312, such as an intranet, internet, or the Internet, either directly or through another external interface. The communication link to the network 312 may be, for example, optical, wired, or wireless (e.g., via satellite or cellular network). The computer system 300 may also connect via the data interface 310 and network 312 to at least one other computer system to perform remote or distributed object trajectory prediction operations. Alternatively, the computer system 300 may include a mainframe or other type of host computer system capable of Web-based communications via the network 312. The computer system 300 may include software for operating a network application such as a web server and/or web client.

The computer system 300 may also include suitable input/output ports, that may interface with a portable data storage device, or use the interconnect bus 306 for interconnection with a local display 316, computer mouse, and keyboard 314 or the like serving as a local user interface for programming and/or data retrieval purposes. A mouse may enable a user to position a pointer over a selectable icon and/or button on display 316 to enable the user to make selections and/or configure an object trajectory prediction system to implement a tracking model and/or display selected graphical or other data associated with tracking an object. The display 316 may include a touch screen capability to enable users to interface with the system 300 by touching portions of the surface of the display 316. Server operations personnel may interact with the system 300 for controlling and/or programming the system from remote terminal devices via the network 312.

The computer system 300 may run a variety of application programs and store associated data in a database of mass storage system 308. One or more such applications may include an object trajectory prediction system according to FIG. 3. The components contained in the computer system 300 may enable the computer system to be used as a server, workstation, personal computer, network terminal, mobile computing device, mobile telephone, System on a Chip (SoC), and the like. As discussed above, the computer system 300 may include one or more applications such as system 300. The system 300 may include software and/or hardware that implements a web server application. The web server application may include software such as HTML, XML, WML, SGML, PHP (Hypertext Preprocessor), CGI, and like languages.

The foregoing features of the disclosure may be realized as a software component operating in the system 300 where the system 300 includes Unix workstation, a Windows workstation, a LINUX workstation, or other type of workstation. Other operation systems may be employed such as, without limitation, Windows, MAC OS, and LINUX. In some aspects, the software can optionally be implemented as a C language computer program, or a computer program written in any high level language including, without limitation, MATLAB, Javascript, Java, CSS, Python, Keras, TensorFlow, PHP, Ruby, C++, C. Shell, C #, Objective-C, Go, R, TeX, VimL, Perl, Scala, CoffeeScript, Emacs Lisp, Swift, Fortran, Visual BASIC, HDL, VHDL, and/or one or more versions of Verilog. Certain script-based programs may be employed such as XML, WML, PHP, and so on. The system 300 may use a digital signal processor (DSP).

As stated previously, the mass storage 308 may include a database. The database may be any suitable database system, including the commercially available or open-source products, such as, but not limited to, Microsoft Access, Sybase, SQL Server, MongoDB, SQLite. The database can be implemented as a local or distributed database system. The database may be supported by any suitable persistent data memory, such as a hard disk drive, RAID system, tape drive system, floppy diskette, or any other suitable system. The system 300 may include a database that is integrated with the system, however, it will be understood that, in other implementations, the database and mass storage 308 can be an external element. The database may include object trajectory and/or flight path files, filter modules, sensor modules, and one or more flight path models and/or algorithms associated with system 300.

In certain implementations, the system 300 may include an Internet browser program and/or be configured to operate as a web server. In some configurations, the client and/or web server may be configured to recognize and interpret various network protocols that may be used by a client or server program. Commonly used protocols include Hypertext Transfer Protocol (HTTP), File Transfer Protocol (FTP), Telnet, and Secure Sockets Layer (SSL), and Transport Layer Security (TLS), for example. However, new protocols and revisions of existing protocols may be frequently introduced. Thus, in order to support a new or revised protocol, a new revision of the server and/or client application may be continuously developed and released.

In one implementation, the system 104 and/or 300 includes a networked-based, e.g., Internet-based, application that may be configured and run on any combination of the other components of system 104 and/or 300. The computer system 300 may include a web server running a Web 2.0 application or the like. Web applications running on system 300 may use server-side dynamic content generation mechanisms such, without limitation, Java servlets, CGI, PHP, or ASP. In certain embodiments, mashed content may be generated by a web browser running, for example, client-side scripting including, without limitation, JavaScript and/ or applets on a wireless device.

In certain implementations, system 104 and/or 300 may include applications that employ Verilog HDL, VHDL, asynchronous JavaScript+XML (Ajax) and like technologies that use asynchronous loading and content presentation techniques. These techniques may include, without limitation, XHTML and CSS for style presentation, document object model (DOM) API exposed by a web browser, asynchronous data exchange of XML data, and web browser side scripting, e.g., JavaScript. Certain web-based applications and services may utilize web protocols including, without limitation, the services-orientated access protocol (SOAP) and representational state transfer (REST). REST may utilize HTTP with XML.

The system 104 and/or computer system 300 may also provide enhanced security and data encryption. Enhanced security may include access control, biometric authentication, cryptographic authentication, message integrity checking, encryption, digital rights management services, and/or other like security services. The security may include protocols such as IPSEC and IKE. The encryption may include, without limitation, DES, 3DES, AES, RSA, ECC, and any like public key or private key based schemes.

Figure 4:
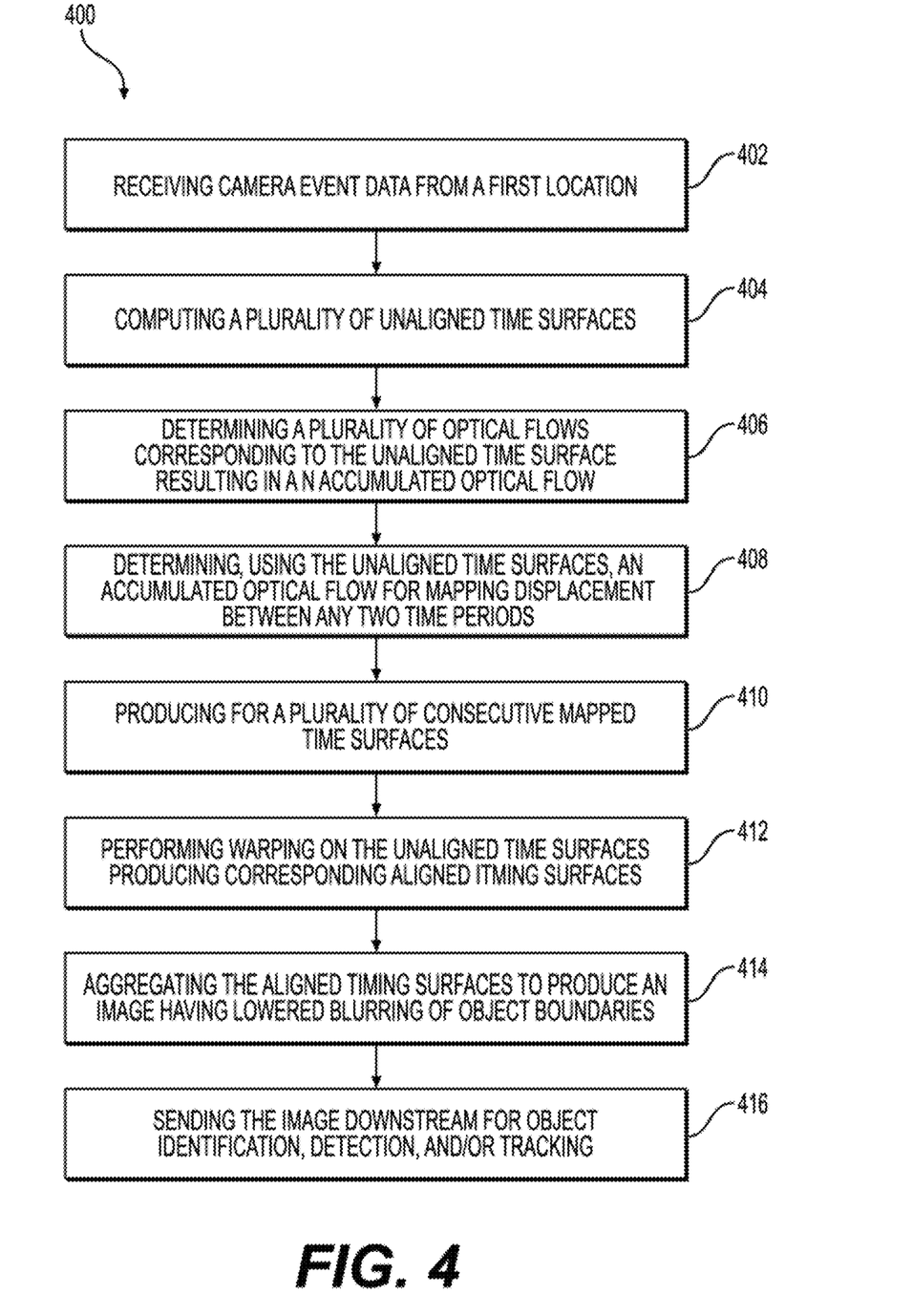
FIG. 4 is a process flowgraph of operations included in an example process 400 for producing aligned time surfaces, in accordance with some embodiments.

FIG. 4 is a process flowgraph of operations included in an example process 400 for producing aligned time surfaces, in accordance with some embodiments. The operations may be implemented using computer-executable instructions stored on one or more non-transitory machine-readable storage media of computer system 300. The instructions may be executed by one or more processing devices, such as CPU 302, as described in FIG. 32, to implement the operations.

Process 400 receiving camera event data from a first location (Step 402). The first location may be an event camera system, such as event camera system 102. In some implementations, the first location may be a remote storage system storing the camera event data remotely. In some implementations, the first location may be a local memory storage of event camera system 102 for storing the camera event data. Process 400 includes computing, using the camera event data, a plurality of unaligned time surfaces (Step 404). For example, alignment system 104 may use the processing capabilities described in computer system 300 to compute unaligned time surfaces. Alignment system 104 may store a plurality of processing applications for processing the camera event data to compute the time surfaces.

Process 400 includes determining a plurality of optical flows corresponding to the unaligned time surfaces resulting in an accumulated optical flow (Step 406). For example, alignment system 400 may utilize Eq. 2 to determine the optical flows for each consecutive time surface. Process 400 includes determining, using the optical flows, an accumulated optical flow for mapping displacement between any two time periods (Step 408). The computation of new optical flows for each time surface results in an accumulated optical flow due to $v(t, \varphi_t(x))$. Moreover, the accumulated optical flow may allow computing the displacement between any two time periods. The more optical flows are computed, the better the accumulated optical flow is in finding the displacement between any two time periods of a time surface, leading to more accurate mapped time surfaces, which are discussed further below.

Process 400 includes producing, using the optical flows, for a plurality of consecutive mapped time surfaces (Step 410). For example, alignment system 104 may use Eq. 1 to compute the consecutive mapped time surfaces. In this case, alignment system 104 may use consecutive unaligned time services to produce the mapped time surfaces. Alignment system 104 may compute the consecutive mapped time surfaces for all of the unaligned time surfaces.

Process 400 includes performing warping, using the accumulated optical flow, on the mapped time surfaces producing corresponding aligned time surfaces (Step 412). For example, alignment system 104 utilizes warping to align the mapped time surfaces in space and time. Moreover, corresponding points on the mapped time surfaces may now be associated. The aligned time surfaces are aggregated to produce an image having lowered blurring of object boundaries (Step 414). For example, alignment system 104 may aggregate all aligned time surfaces to form an image of much-improved quality. The image may include lower blurring of object boundaries making this image relevant for object detection and identification.

Process 400 includes sending the image downstream to an object identification, detection, and/or tracking process (Step 416). In this case, alignment system 104 may send the image downstream to be used by an sending the image downstream to an object identification, detection, and/or tracking process. In some cases, alignment system 104 may send the image downstream to object identification detection, and/or tracking system 106. Object identification detection, and/or tracking system 106 may be a system, such as computer system 300, implemented with one or more object identification detection, and/or tracking applications for actively identifying and detecting an object in the image in real time. The image quality is such that object identification and detection system 106 minimizes the misclassification of objects in the image and better-defined object boundaries allow for improved object detection.

Figure 5:
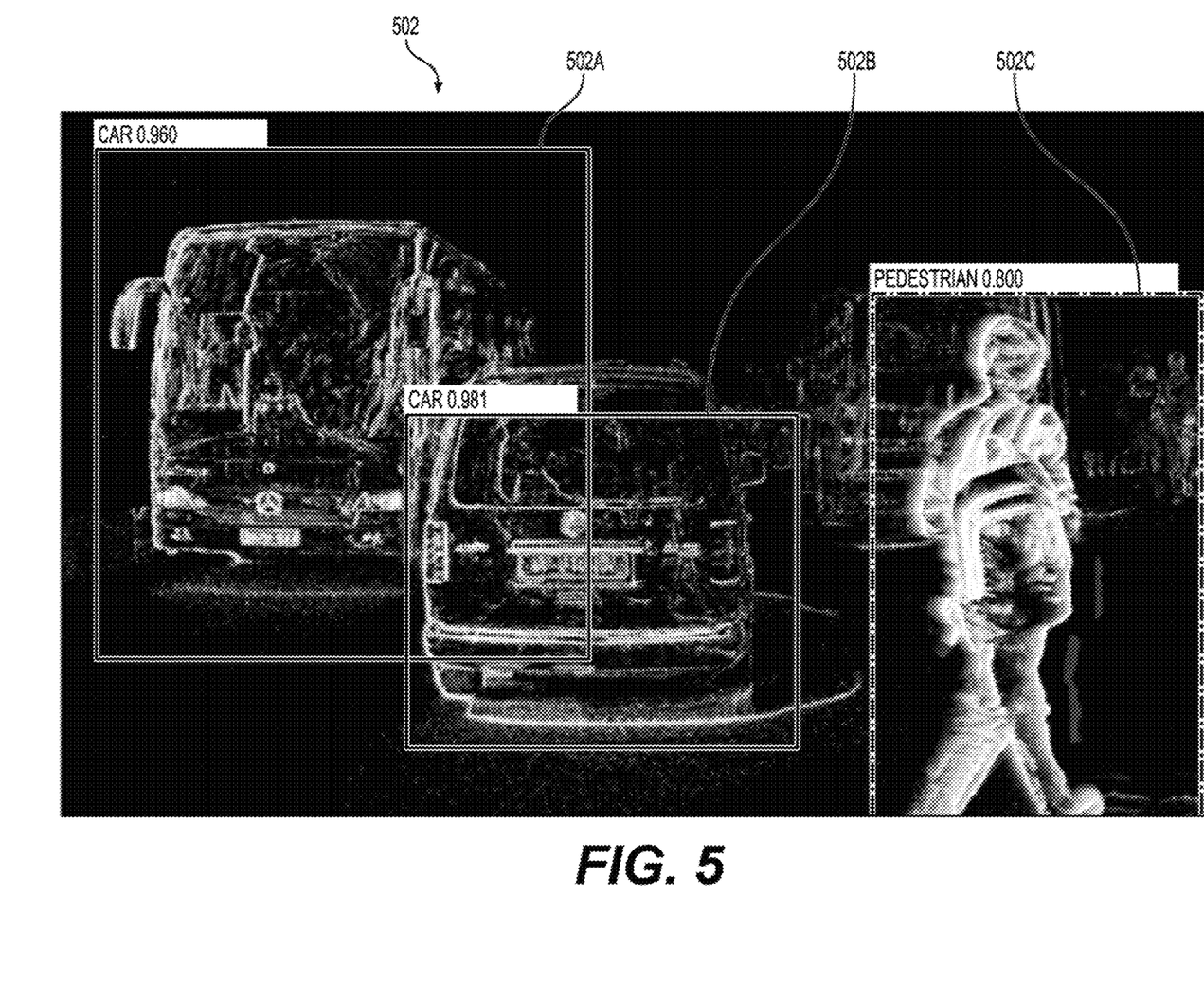
FIG. 5 is a schematic diagram of object identification and detection improvements using an image with time aligned time surfaces, in accordance with some embodiments.

FIG. 5 is a schematic diagram of object identification and detection improvements using an image with time aligned time surfaces, in accordance with some embodiments. Specifically, FIG. 5 includes two similar images, 502 and 504, where image 502 has aligned time surfaces, and image 504 does not. An object identification, detection, and/or tracking system, similar to object identification, detection, and/or tracking system 106 uses images 502 and 504 for comparison purposes.

With respect to image 502, the object identification, detection, and/or tracking system correctly identified and detected a bus 502A, a motor vehicle 502B, and a pedestrian 502C. There are no indications of misclassification in image 502. Concerning image 504, the object identification, detection, and/or tracking system correctly identified and detected a bus 504A, a motor vehicle 504B, and pedestrian 504C. However, the object identification, detection, and/or tracking system mis-classifies the bus's mirror as pedestrian 504D. In the region that included pedestrian 504C, the object identification and detection system mis-classifies a two-wheeler 504E and a car 504F, both of which are not present in image 504.

One of the reasons the object identification, detection, and/or tracking system mis-classifies pedestrian 504D, two-wheeler 504E, and car 504F may be due to the blurring of the object boundaries. This is more evident in the region that included pedestrian 504C. There is considerably more blurring in the immediate area of pedestrian 504C compared to pedestrian 502C of image 502, resulting in the misclassifications of two-wheeler 504E and car 504F in this same region. Using aligned time surfaces results in better defining object boundaries/details, increasing object identification, detection, and/or tracking, and lowering objects' misclassification.

The disclosure describes systems and methods for producing aligned time surfaces for event-based object detection, identification, and tracking. The advantages provided include aligned time surfaces aggregating events in time and reducing blurring, which is expected to improve downstream tasks. The computation of optical flows is used to determine the aligned time surfaces. Also, warping is used to align the aligned time surfaces to a common point in time of interest. Aggregating these aligned time surfaces forms an image with a lower blur of object boundaries and increased detail.

Reference in the specification to "one implementation" or "an implementation" means that a particular feature, structure, or characteristic described in connection with the implementation is included in at least one implementation of the disclosure. The appearances of the phrase "in one implementation," "in some implementations," "in one instance," "in some instances," "in one case," "in some cases," "in one embodiment," or "in some embodiments" in various places in the specification are not necessarily all referring to the same implementation or embodiment.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Accordingly, the present disclosure is intended to be illustrative, but not limiting, of the scope of the present disclosure, which is set forth in the following claims.

What is claimed is:

1. A system for producing aligned time surfaces, the system comprising one or more computing device processors; and
   one or more computing device memories, coupled to the one or more computing device processors, the one or more computing device memories storing instructions executed by the one or more computing device processors, wherein the instructions are configured to:
   receive camera event data from a first location;
   compute, using the camera event data, a plurality of unaligned time surfaces;
   determine a plurality of optical flows corresponding to the unaligned time surfaces;
   determine, using the optical flows, corresponding displacement parameters by respectively combining (a) a location to be mapped and (b) a result of using an integral on an optical flow of the optical flows for mapping displacement between any two time periods;
   produce, using the displacement parameters, a plurality of consecutive mapped time surfaces;
   perform warping, using the optical flows, of the mapped time surfaces producing corresponding aligned time surfaces; and
   aggregate the aligned time surfaces to produce an image having lowered blurring of object boundaries.

2. The system of claim 1, wherein the first location is an event camera system.

3. The system of claim 1, wherein the first location is a remote storage device for storing the camera event data.

4. The system of claim 1, wherein while computing the unaligned time surfaces, the instructions are configured to aggregate the unaligned time surfaces in accordance with time and space.

5. The system of claim 1, wherein the unaligned time surfaces comprise information of at least one moving object.

6. The system of claim 1, wherein while determining the plurality of optical flows, the instructions are configured to determine a velocity of at least one moving object in the unaligned time surfaces.

7. The system of claim 1, wherein while performing warping of the unaligned time surfaces, the instructions are configured to align, using an accumulated optical flow, the aligned time surfaces in accordance with time and space.

8. The system of claim 1, wherein the instructions further configured to send the image downstream to an object identification, detection, and/or tracking process.

9. The system of claim 8, wherein while sending the image downstream, the instructions are configured to execute the object identification, detection, and/or tracking process on a remote system.

10. A method for producing aligned time surfaces, the method comprising:
receiving camera event data from a first location;
computing, using the camera event data, a plurality of unaligned time surfaces;
determining a plurality of optical flows corresponding to the unaligned time surfaces;
determining, using the optical flows, corresponding displacement parameters by respectively combining (a) a location to be mapped and (b) a result of using an integral on an optical flow of the optical flows for mapping displacement between any two time periods;
producing, using the displacement parameters, a plurality of consecutive mapped time surfaces;
performing, using the optical flows, warping of the mapped time surfaces producing corresponding aligned time surfaces; and
aggregating the aligned time surfaces to produce an image having lowered blurring of object boundaries.

11. The method of claim 10, wherein the first location is an event camera system.

12. The method of claim 10, wherein the first location is a remote storage device for storing the camera event data.

13. The method of claim 10, wherein the computing the unaligned time surfaces comprises aggregating the unaligned time surfaces in accordance with time and space.

14. The method of claim 10, wherein the unaligned time surfaces comprise information of at least one moving object.

15. The method of claim 10, wherein determining the plurality of optical flows comprises determining a velocity of at least one moving object in the unaligned time surfaces.

16. The method of claim 15, wherein an accumulated optical flow comprises accumulated information associated with processing of the optical flows.

17. The method of claim 16, wherein performing warping of the unaligned time surfaces comprises aligning, using the accumulated optical flow, the aligned time surfaces in accordance with time and space.

18. The method of claim 10 further comprising sending the image downstream to an object identification, detection, and/or tracking process.

19. The method of claim 18, wherein sending the image downstream comprises executing the object identification, detection, and/or tracking process on a remote system.

20. A non-transitory computer-readable storage medium storing instructions which when executed by a computer cause the computer to perform a method for producing aligned time surfaces, the method comprising:
receiving camera event data from a first location;
computing, using the camera event data, a plurality of unaligned time surfaces;
determining a plurality of optical flows corresponding to the unaligned time surfaces;
determining, using the optical flows, corresponding displacement parameters by respectively combining (a) a location to be mapped and (b) a result of using an integral on an optical flow of the optical flows for mapping displacement between any two time periods;
producing, using the displacement parameters, a plurality of consecutive mapped time surfaces;
performing warping, using the optical flows, of the mapped time surfaces producing corresponding aligned time surfaces; and
aggregating the aligned time surfaces to produce an image having lowered blurring of object boundaries.

\* \* \* \* \*